3,450,548
Patented June 17, 1969

3,450,548
ACID-RESISTANT CEMENT PRODUCTS
John J. Petkus, Whiting, Ind., assignor to Standard Oil Company, Chicago, Ill., a corporation of Indiana
No Drawing. Filed Dec. 27, 1965, Ser. No. 516,717
Int. Cl. C04b 35/14
U.S. Cl. 106—84                                                    15 Claims

ABSTRACT OF THE DISCLOSURE

A chemically-setting, acid-resistant cement product prepared from a mix comprising: (a) silica sand, (b) silicate of soda, (c) a very fine aggregate having a particle size corresponding to that of silica flour, said fine aggregate being selected from the group consisting of topaz, amblygonite, lepidolite, sodalite, fluorite, and mixtures thereof, (d) sodium silicofluoride, and (e) a fully basic sodium phosphate of the group consisting of sodium orthophosphate, sodium tripolyphosphate, sodium hexametaphosphate, the combined amounts of said sodium silico-fluoride and said phosphate being effective to cause said acid resistant cement product to set.

---

This invention relates to acid-resistant cement products. More particularly, it relates to chemically-setting acid-resistant cement products containing silicate of sode as a binder.

Acid-resistant compositions of cements, mortars and concrete employing silicate of sode as a cementitious agent are well known. Such acid-resistant cements generally consist of a silicate of soda solution, an acidic setting agent and an acid-resistant aggregate, and these cements set chemically, rather than by drying. Almost all of these cements have compressive strengths not exceeding about 2,500 p.s.i., which is considered too low to enable these materials to be widely used in concrete construction. Present silicate of soda cements are also subject to severe restrictions in their use for resistance to sulfuric acid, because of sulphate disintegration which occurs when sulfuric acid permeates the cement and combines with free or loosely bound sodium. This mechanism is believed to result in the formation of sodium sulphate which is deposited as anhydrous $Na_2SO_4$ crystals in pores close to the exposed faces of the cement. The presence of moisture then causes hydration to Glauber's salt, $Na_2SO_4 \cdot 10H_2O$, with resultant expansion forces which disrupt the cement and cause it to crack and disintegrate.

Chemically-setting, acid-resistant cement products, e.g., cements, mortars, concretes, etc., having increased resistance to sulfate disintegration are the subject matter of U.S. Patent No. 3,138,471, the disclosure of which is incorporated by reference herein and made a part hereof.

The cement mix ingredients employed in the preparation of such cement products are generally within the following proportions:

| | Parts by weight |
|---|---|
| Fine acid-resistant aggregate | 1,000 |
| Sodium silicate | 100–250 |
| Very fine acid-resistant aggregate | 200–1,000 |
| Setting agent | 12–500 |
| Alkali metal phosphate | 6–100 |
| Water, as needed for consistency. | |

The preferred range of mix components is:

| | Parts by weight |
|---|---|
| Graded silica sand | 525 |
| Sodium silico-fluoride | 10–150 |
| Sodium phosphate | 6–28 |
| Silica flour | 280–410 |
| Silicate of soda solution (37.6% solids) | 200–250 |
| Water | 0–20 |

The preferred mix formulation is:

| | Parts by weight |
|---|---|
| Silica sand, 20–30 mesh | 525 |
| Silica flour, passing 325 mesh | 350 |
| Sodium silico-fluoride, passing 100 mesh | 50.8 |
| Sodium tripolyphosphate, passing 100 mesh | 15 |
| Silicate of soda (37.6% solids), 1:3.22 soda to silica ratio | 234 |
| Water, not to exceed 15 parts by weight. | |

In the aforesaid patent, the patentee discloses that maximum acid-resistance is obtained with the use of pure silica as the acid-resistant aggregate. Further, that maximum volume stability of the cementitious matrix is achieved when finely-divided substantially anhydrous silica, such as silica flour, is used as the very fine aggregate.

It has been discovered that the acid-resistance of the cement products of the patent, referred to above and described herein, can be improved by the substitution of about 1–100% of the silica flour in the described cement product mixes with a finely ground natural mineral, having a particle size corresponding to said silica flour, of the group consisting of topaz, amblygonite, lepidolite, sodalite, fluorite and mixtures thereof.

In accordance with the present invention, a series of "horseshoe-shaped" concrete specimens corresponding to the preferred mix formulation, set forth above, were prepared wherein each of the aforesaid minerals in amounts of 10, 40, 70 and 100% were substituted for the silica flour ingredient of the formulation. These specimens were one-inch square castings shaped to form a horseshoe having a height of four inches and an external leg width of about 3.75 inches. After the specimens were air dried for about two weeks, the acid-resistance of the samples comprising 100% silica flour and the varying proportions of the defined substitute minerals was determined by immersing one of the legs of the specimen, with appropriate support thereof, in 10% aqueous sulfuric acid solution with the other leg in the air. After fifteen weeks, the control specimens containing only silica flour failed; whereas failure of the test specimens containing 10, 40, 70 and 100% of each of the aforesaid minerals did not occur until after immersion for twenty-two weeks. Accordingly, an improved acid-resistant cement product can be obtained by the substitution of any of the topaz amblygonite lepidolite, sodalite or fluorite minerals alone or in mixtures thereof for a portion or all of the silica flour ingredient of the chemically-setting cementitious product compositions described in the aforesaid patent. The use of other naturally occurring minerals, such as apatite, chlorapatite, chondrodite and cryolite, were ineffectual substitutes for silica flour. Thus, the present invention provides means for obtaining improved acid-resistant cementitious products that are not obtainable by the use of silica flour alone as the very finely-divided aggregate in chemically-setting alkali silicate cement compositions.

I claim:

1. In a chemically-setting, acid-resistant cement product prepared from a mix comprising: (a) silica sand, (b) silicate of soda, (c) a very fine aggregate having a particle size corresponding to that of silica flour, (d) sodium silico-fluoride, and (e) a fully basic sodium phosphate of the group consisting of sodium orthophosphate, sodium tripolyphosphate, sodium hexametaphosphate, the combined amounts of said sodium silico-fluoride and said phosphate being effective to cause said acid resistant cement product to set; the improvement wherein said fine aggregate comprises in excess of about 1% of a compound selected from the group consisting of topaz, amblygonite, lepidolite, sodalite, fluorite, and mixtures thereof.

2. The cement product defined in claim 1 wherein said fine aggregate additionally includes silica flour.

3. The cement product defined in claim 2 wherein said fine aggregate comprises from 0 to 99% of said silica flour.

4. A chemically-setting, acid resistant cement product prepared from a mix comprising silica sand in an amount of about 1,000 parts by weight; silicate of soda in an amount between about 100 to about 250 parts by weight; a very fine aggregate in an amount between about 200 and about 1,000 parts by weight, said fine aggregate including in excess of 1% by weight of a finely ground mineral selected from the group consisting of topaz, amblygonite, lepidolite, sodalite, fluorite, and mixtures thereof; sodium silico-fluoride in an amount between about 12 and about 500 parts by weight; and a fully basic sodium phosphate selected from the group consisting of sodium orthophosphate, sodium tripolyphosphate, and sodium hexametaphosphate, in an amount between about 6 and about 100 parts by weight.

5. The cement product defined in claim 3 wherein said fine aggregate additionally includes silica flour.

6. The cement product defined in claim 5 wherein said fine aggregate comprises from 0 to 99% of said silica flour.

7. A chemically-setting, acid resistant cement product prepared from a mix comprising about 525 parts by weight of fine silica sand; about 10 to 150 parts by weight of sodium silico-fluoride; about 6 to about 28 parts by weight of fully basic sodium phosphate selected from the group consisting of sodium orthophosphate, sodium tripolyphosphate and sodium hexametaphosphate; about 280 to about 410 parts by weight of very fine aggregate including in excess of 1% by weight of a finely ground natural mineral selected from the group consisting of topaz, ambylgonite, lepidolite, sodalite, fluorite, and mixtures thereof; and about 200 to about 250 parts by weight of silicate of soda solution (37.6% solids).

8. The cement product defined in claim 7 wherein said fine aggregate additionally includes silica flour.

9. The cement product defined in claim 8 wherein said fine aggregate comprises from 0 to 99% of said silica flour.

10. A chemically-setting, acid-resistant cement product prepared from a mix comprising about 525 parts by weight of 20 to 30 mesh silica sand; about 350 parts by weight of a very fine aggregate substantially passing through 325 mesh, said aggregate including in excess of 1% of a finely ground natural mineral selected from the group consisting of topaz, amblygonite, lepidolite, sodalite, fluorite, and mixtures thereof; about 50 parts by weight of sodium-silico-fluoride; about 15 parts by weight of a fully basic sodium phosphate selected from the group consisting of sodium orthophosphate, sodium tripolyphosphate and sodium hexametaphosphate; and about 230 parts by weight of a silicate of soda solution (37.6% solids).

11. The cement product defined in claim 10 wherein said fine aggregate additionally includes silica flour.

12. The cement product defined in claim 11 wherein said fine aggregate comprises from 0 to 99% of said silica flour.

13. In a chemically-setting, acid-resistant cement product prepared from a mix comprising: (a) silica sand, (b) silicate of soda, (c) a very fine aggregate having a particle size corresponding to that of silica flour, (d) sodium silico-fluoride, and (e) a fully basic sodium phosphate of the group consisting of sodium orthophosphate, sodium tripolyphosphate, sodium hexametaphosphate, the combined amounts of said sodium silico-fluoride and said phosphate being effective to cause said acid resistant cement product to set; the improvement wherein said fine aggregate comprises a compound selected from the group consisting of topaz, lepidolite, sodalite, and mixtures thereof.

14. The cement product defined in claim 13 wherein said fine aggregate additionally includes silica flour.

15. The cement product defined in claim 14 wherein said fine aggregate comprises from 0 to 99% of said siilca flour.

References Cited
UNITED STATES PATENTS

| | | | |
|---|---|---|---|
| 2,429,946 | 10/1947 | Roach | 106—84 |
| 2,914,413 | 11/1959 | Mercer | 106—84 |
| 3,138,471 | 6/1964 | Wygant | 106—84 |

JAMES E. POER, *Primary Examiner.*

PO-1050
(5/69)

UNITED STATES PATENT OFFICE
CERTIFICATE OF CORRECTION

Patent No. 3,450,548      Dated    June 17, 1969

Inventor(s) JOHN J. PETKUS

It is certified that error appears in the above-identified patent and that said Letters Patent are hereby corrected as shown below:

Column 2, line 47, after the word "topaz" there should be a comma; lines 47 and 48, after the word "amblygonite" there should be a comma. In Claim 5, the claim reference numeral "3" should be --4--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents